United States Patent
Kiehn et al.

(10) Patent No.: US 10,570,870 B2
(45) Date of Patent: Feb. 25, 2020

(54) HYBRID MODULE, HYBRID UNIT AND MOTOR VEHICLE AS WELL AS STARTING PROCESS FOR AN INTERNAL COMBUSTION ENGINE

(71) Applicant: Ford Global Technologies, LLC, Dearborn, MI (US)

(72) Inventors: Rainer Kiehn, Frechen (DE); Moritz Klaus Springer, Hagen (DE); Krystian Dylong, Cologne (DE); Martin Lutz, Cologne (DE); Georg Louven, Neuwied (DE)

(73) Assignee: Ford Global Technologies, LLC, Dearborn, MI (US)

(*) Notice: Subject to any disclaimer, the term of this patent is extended or adjusted under 35 U.S.C. 154(b) by 116 days.

(21) Appl. No.: 15/885,245

(22) Filed: Jan. 31, 2018

(65) Prior Publication Data
US 2018/0238291 A1   Aug. 23, 2018

(30) Foreign Application Priority Data

Feb. 17, 2017 (DE) .......... 10 2017 202 606

(51) Int. Cl.

| | |
|---|---|
| *B60K 6/485* | (2007.10) |
| *F02N 15/02* | (2006.01) |
| *B60K 6/387* | (2007.10) |
| *B60K 6/48* | (2007.10) |
| *F02N 11/00* | (2006.01) |

(Continued)

(52) U.S. Cl.
CPC .......... *F02N 15/02* (2013.01); *B60K 6/387* (2013.01); *B60K 6/48* (2013.01); *B60K 6/485* (2013.01); *F02N 11/003* (2013.01); *F02N 11/04* (2013.01); *F02N 11/0851* (2013.01); *F02N 11/0859* (2013.01); *F02N 11/0862* (2013.01); *B60K 2006/268* (2013.01); *B60K 2006/4841* (2013.01); *F02N 2200/023* (2013.01);

(Continued)

(58) Field of Classification Search
None
See application file for complete search history.

(56) References Cited

U.S. PATENT DOCUMENTS

| | | | |
|---|---|---|---|
| 5,633,555 A | 5/1997 | Ackermann et al. | |
| 6,007,443 A * | 12/1999 | Onimaru | B60W 20/10 475/5 |

(Continued)

FOREIGN PATENT DOCUMENTS

| | | |
|---|---|---|
| DE | 1007959 B | 5/1957 |
| DE | 102010010268 A1 | 9/2011 |

*Primary Examiner* — Justin Holmes
(74) *Attorney, Agent, or Firm* — David Kelley; McCoy Russell LLP

(57) ABSTRACT

Embodiments for a hybrid drive are provided. In one example, a hybrid module for arrangement on an internal combustion engine, which is configured for starting the internal combustion engine, includes an electric motor, for generating a torque, and an output element connected in a torque-transmitting manner to the electric motor and positioned on an output axle, for transmission of the torque to a crankshaft of the internal combustion engine. According to the disclosure, the hybrid module has a magnetic transmission, wherein the torque of the electric motor is transmitted via the magnetic transmission to the output element.

18 Claims, 6 Drawing Sheets

(51) Int. Cl.
*F02N 11/04* (2006.01)
*F02N 11/08* (2006.01)
*B60K 6/26* (2007.10)
*H02K 49/10* (2006.01)

(52) U.S. Cl.
CPC ...... *F02N 2200/042* (2013.01); *H02K 49/102* (2013.01); *Y02T 10/6221* (2013.01)

(56) References Cited

U.S. PATENT DOCUMENTS

| | | | |
|---|---|---|---|
| 2012/0101677 A1* | 4/2012 | Ikegami | B60K 6/48 |
| | | | 701/22 |
| 2013/0116088 A1* | 5/2013 | Gibson | B60W 10/06 |
| | | | 477/80 |
| 2016/0359441 A1 | 12/2016 | Calverley et al. | |
| 2017/0036528 A1 | 2/2017 | O'Brien et al. | |
| 2017/0137016 A1* | 5/2017 | Yang | B60W 20/13 |
| 2018/0022353 A1* | 1/2018 | Thompson | B60K 6/387 |
| | | | 701/22 |

\* cited by examiner

HYBRID MODULE, HYBRID UNIT AND MOTOR VEHICLE AS WELL AS STARTING PROCESS FOR AN INTERNAL COMBUSTION ENGINE

CROSS REFERENCE TO RELATED APPLICATION

This application claims priority to German Patent Application No. 102017202606.5, filed Feb. 17, 2017. The entire contents of the above-referenced application are hereby incorporated by reference in their entirety for all purposes.

FIELD

The present disclosure relates to a hybrid module which is configured for starting an internal combustion engine, which forms a hybrid unit together with the internal combustion engine and is arranged in a motor vehicle. The present disclosure further relates to a starting process, in the case of which the internal combustion engine is started by the hybrid module.

BACKGROUND/SUMMARY

DE 102010010268 A1 discloses a hybrid drive system for a motor vehicle with an internal combustion engine, a stop-start automatic system, an electric machine, and a starting device for starting the internal combustion engine. The starting device has a starting motor in the form of a three-phase motor and a drive shaft with a pinion. A crankshaft of the internal combustion engine furthermore has a starting sprocket wheel. In order to start the internal combustion engine, a transmission of force is carried out from the pinion to the starting sprocket wheel. A transmission ratio of the gear wheel pairing comprising the pinion and the starting sprocket wheel lies in the range from 30 to 50 and a voltage level of the supply voltages of the starting device and the electric machine is substantially identical. In order to start the internal combustion engine, a current of the three-phase motor of the starting device is controlled so that, during starting of the internal combustion engine, teeth of the pinion always bear with a flank directed in the starting direction against a flank, directed counter to the starting direction, of teeth of the starting sprocket wheel.

However, the inventors herein have recognized an issue with the above approach. Due to the relatively large amount of torque required to crank the engine at cold ambient temperatures, the electric motor is unable to start the engine under all conditions, and thus the starting device is included to enable cold engine starts. However, the starting device adds additional weight and packaging space to the engine/hybrid module unit, increasing costs and reducing fuel economy.

Accordingly, a hybrid module is presented herein to at least partly address the above issues. In one example, a hybrid module for arrangement on an internal combustion engine, and configured for starting the internal combustion engine, includes an electric motor, for generating a torque, an output element connected in a torque-transmitting manner to the electric motor and positioned on an output axle, for transmission of the torque to a crankshaft of the internal combustion engine, and a magnetic transmission, the torque of the electric motor configured to be transmitted via the magnetic transmission to the output element.

The hybrid module according to the disclosure is configured for arrangement on an internal combustion engine and for starting the internal combustion engine. The hybrid module comprises an electric motor, for generating a torque, and an output element connected in a torque-transmitting manner to the electric motor and positioned on an output axle, for transmission of the torque to a crankshaft of the internal combustion engine. According to the disclosure, the hybrid module has a magnetic transmission, wherein the torque of the electric motor may be transmitted via the magnetic transmission to the output element.

An example magnetic transmission is disclosed in DE 4405701 A1, which shows a magnetic transmission with several parts which interact magnetically and are movable relative to one another, of which one is connected to a drive shaft, one is connected to an output shaft and one is fixed, the fields generated by the permanent magnets being modulated by magnetically soft, flow-conducting parts, of which at least one is a toothed iron yoke. Structures which generate magnetic fields on the side facing the iron yoke by means of permanent magnets, which magnetic fields have alternating North and South poles along the circumference, are located on both sides of the iron yoke. The structure has on one side p1 pairs of North and South poles, the iron yoke on the side facing this structure having $Z1=p1\pm N$ teeth and N being an integer. The structure has on other side p2 pairs of North and South poles, the iron yoke on the side facing this structure having $Z2=p2\pm M$ teeth, M being an integer and M being equal to N.

It is thus advantageously enabled to start the internal combustion engine with the electric motor of the hybrid module. A separate starter may be omitted which reduces costs and weight. The magnetic transmission has a high level of efficiency, is overload-proof, requires essentially no lubrication, runs with a very low level of noise, and is wear-free.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
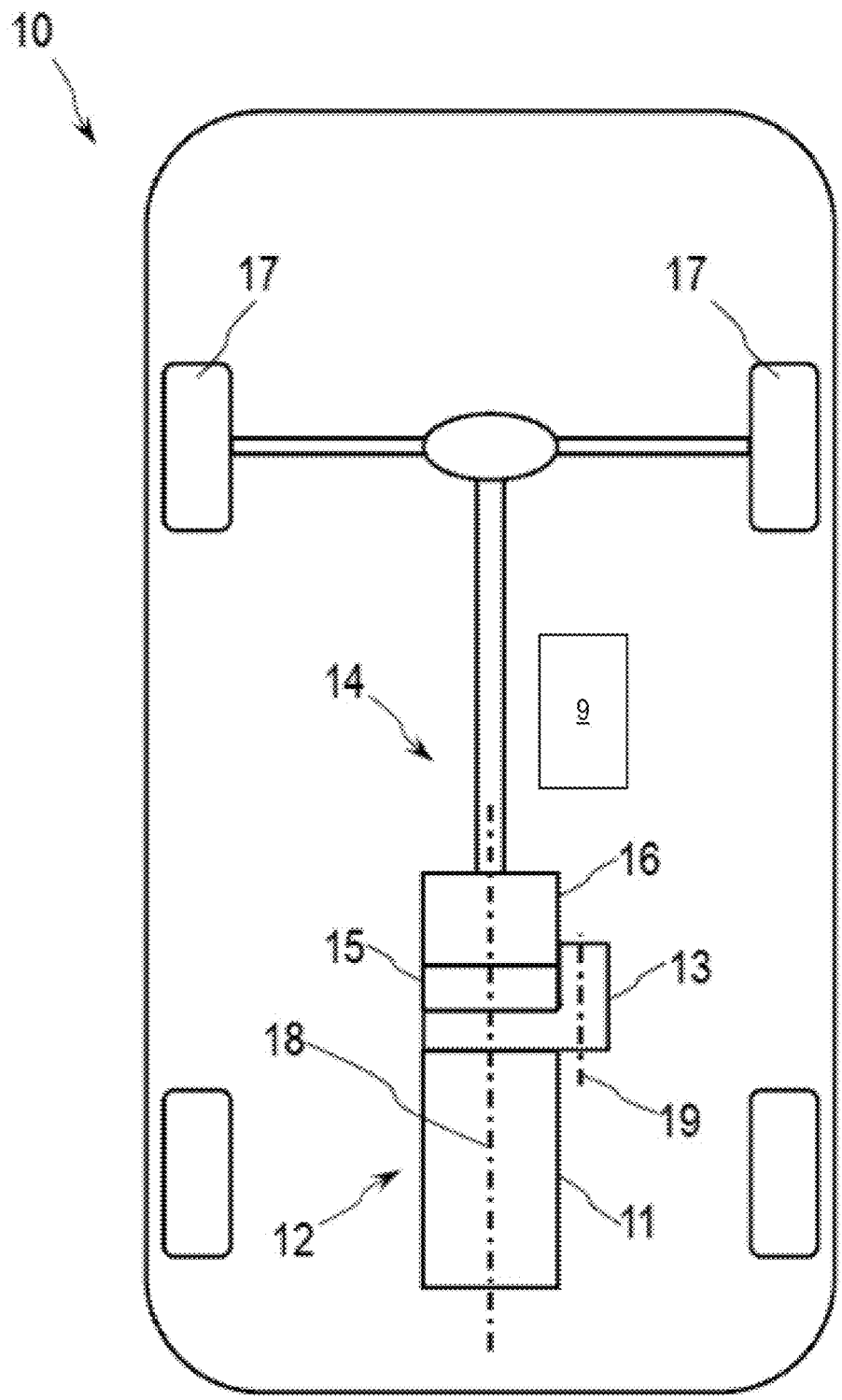
FIG. 1 shows a motor vehicle according to the disclosure in an exemplary configuration.

Some vehicles may be configured as mild hybrid vehicles. Mild hybrids include an electric motor and associated electronics that are relatively low-voltage, but higher voltage than standard 12-V vehicle electrical systems (e.g., 48 V). The 48-V electric motor is capable of assisting the engine during certain conditions (e.g., spooling up a turbocharger prior to a vehicle launch, starting the engine following an automatic stop) as well as supplying power to certain high-demand vehicle electrical components, such as the AC compressor, water pump, etc. In some configurations, the electric motor may also power the wheels (independent of the engine) during low vehicle speed or torque demand conditions. By assisting the engine during some conditions, allowing for certain vehicle components to be operated electrically (and thus on demand) rather than mechanically via the engine, and also allowing for energy recuperation via regenerative braking, mild hybrids may offer a significant fuel savings relative to standard, non-hybrid vehicles without requiring the high-cost, high-voltage motors and batteries of full hybrids or electric-only vehicles. However, due to the relatively low voltage, the electrical motor in mild hybrid configurations is not capable of generating a significant amount of torque (e.g., to power the wheels during typical vehicle operation). Thus, a separate starter device, such as a conventional 12V starter motor, is still included in mild hybrids to facilitate engine starts during cold ambient temperatures.

According to embodiments disclosed herein, the conventional starter device may be replaced with a variable transmission that includes a reduction gear ratio. The transmission may be coupled to the drive train pulley of the hybrid module, which is directly coupled to the engine crankshaft. The drive train pulley is driven by the electric motor (e.g., via a belt). The transmission may include two stages or gears, a first, reduction gear (e.g., with a transmission ratio of 1:3) and a second, standard gear (e.g., with a transmission ratio of 1:1). During most operating conditions, the electric motor may drive (or be driven by) the engine crankshaft with the transmission in the second gear, allowing the same torque generated by the electric motor to be applied to the crankshaft. During certain operating conditions, such as an engine start at cold ambient temperatures or other times where higher torque is required to rotate the engine, the electric motor may drive the crankshaft with the transmission in the first gear. Due to the transmission ratio of the first gear, the speed at which the crankshaft is rotated may be lowered, but the torque applied to the crankshaft may be increased, thus allowing the engine to be started even in cold temperatures where the torque generated by the electric motor alone is not sufficient to start the engine.

The transmission may be a magnetic transmission. Magnetic transmissions may be lower in weight, offer more compact packaging space, and provide greater efficiency than mechanical gear sets. Further, magnetic transmissions do not produce noise, generate no friction (as they use roller bearings only), do not require lubrication, and include damping and overload features. In contrast, a mechanical epicyclic transmission may generate too much noise and friction to be reliably used in the context of starting the engine with the electric motor and without a starter motor, and may quickly degrade due to the high friction. In a configuration of the hybrid module according to the disclosure, the magnetic transmission is arranged centrally with respect to the drive axle. The magnetic transmission can thus act directly, therefore without further machine components such as gear wheels or the like, on the crankshaft, thereby providing a compact and lightweight design.

In a further configuration of the hybrid module according to the disclosure, the magnetic transmission has a first stage with a first transmission ratio and a second stage with a second transmission ratio which is different from the first transmission ratio. It is thus advantageously made possible to use the torque of the electric motor in two different transmission ratios.

In a further configuration of the hybrid module according to the disclosure, the transmission ratio of the first stage is a reduction ratio. In particular, the reduction ratio is 1:3. The torque generated by the electric motor is thus increased and the rotational speed is reduced. The increased breakaway torque of a crank drive may be overcome. A reduction ratio of 1:3 may generate sufficient torque for starting the engine at cold ambient temperatures while still cranking the engine at a high enough speed to start the engine. Other reduction ratios are possible, however, depending on the configuration of the engine and the cranking speed indicated for starting the engine, as well as the torque output and speed of the electric motor.

In a further configuration of the hybrid module according to the disclosure, the second stage has a transmission ratio of 1:1. A higher rotational speed is thus available than in the first stage. The second stage may be used in the case of non-increased breakaway torques of the crank drive since the higher rotational speed benefits the start-up performance of the internal combustion engine.

The hybrid module according to the disclosure may be integrated into a hybrid unit which also has an internal combustion engine. The hybrid module is connected in such a manner to the internal combustion engine that the output axle is identical to a crankshaft axle in which the crankshaft of the internal combustion engine is arranged. The hybrid unit in turn may be integrated into a motor vehicle. The hybrid unit is configured to carry out the starting process according to the disclosure.

In the case of the starting process according to the disclosure, an internal combustion engine is started in that a torque is generated by an electric motor in electric motor running and the torque is transmitted to a crankshaft of the internal combustion engine. According to the disclosure, the torque is modified by a magnetic transmission as a function of a parameter determined in a determination. As a result, it is possible to react to different conditions and the torque generated by the electric motor for starting the internal combustion engine can be adapted easily and quickly.

In an example of the starting process according to the disclosure, a breakaway torque of a crank drive of the internal combustion engine is determined in the determination. Here, the torque is increased in a first magnetic transmission operation if it is ascertained in a test that the breakaway torque has a specific value. As a result, an increased breakaway torque of the crank drive is overcome.

In a further example of the starting process according to the disclosure, the torque is maintained in a second magnetic transmission operation if it is ascertained in the test that the breakaway torque undershoots the specific value. As a result, the internal combustion engine may be started with a higher rotational speed than in the first stage.

In example of the starting process according to the disclosure, to determine the breakaway torque, a temperature is measured and the breakaway torque is assumed on the basis of this temperature. As a result, the determination of the breakaway operation is simplified since the temperature sensors which are already present, for example, for the cooling fluid, may be used.

In FIG. 1, the motor vehicle 10 according to the disclosure is represented schematically in one exemplary configuration. Motor vehicle 10 is configured in particular in a mild hybrid configuration and has a hybrid unit 12. Hybrid unit 12 comprises, in addition to an internal combustion engine 11, a hybrid module 13 with an electric motor 21. In this case, internal combustion engine 11 is a reciprocating piston engine with a crank drive (e.g., a crankshaft). Electric motor 21 is configured in particular here to also be operated as a generator. Hybrid unit 12 is configured to drive the motor vehicle 10. To this end, hybrid unit 12 is connected to a drive train 14 which transmits the power supplied by hybrid unit 12 to at least one wheel 17 of motor vehicle 10. Drive train 14 has in particular a clutch 15 as well as a transmission 16. Clutch 15 is configured to alternately connect and separate transmission 16 and hybrid unit 12. Clutch 15 can in this case be, for example, a starting clutch if transmission 16 is configured as a manual transmission, or clutch 15 can be, for example, a torque converter if the transmission is configured as an automatic transmission or continuously variable transmission. Clutch 15 can also be integrated into transmission 16.

Motor vehicle 10 includes an electronic controller 9. The electronic controller is described in this case as being a single control unit operable to control not only the general operation of the engine 11 but also the hybrid module 13. It will however be appreciated that the electronic controller could comprise of a number of interlinked electronic controllers providing in combination the same functionality. Electronic controller 9 may be a conventional microcomputer including a microprocessor unit, input/output ports, read-only memory (e.g., non-transitory memory), random access memory, keep alive memory, and a conventional data bus. The storage medium read-only memory may be programmed with computer readable data representing instructions executable by the processor for performing the methods described below as well as variations thereof.

In the case of the example shown in FIG. 1 the inputs to the electronic controller 9 include at least one input from which the temperature of the engine 11 can be deduced and in this case comprise sensor inputs indicative of ambient air temperature; intake air temperature; coolant temperature; cylinder head temperature and engine cylinder block temperature and at least one input indicative of engine speed and/or electric motor speed.

The electronic controller 9 is operatively connected to various devices and sensors associated with engine 11 and with hybrid module 13, including devices described below with respect to FIG. 2 (e.g., magnetic transmission).

The electronic controller 9 may include an engine stop-start controller for the motor vehicle 10 and the inputs to the electronic controller may also include inputs for use in determining when the engine 11 should be automatically stopped in order to save fuel. Such a stop is referred to herein as an 'E-stop' because its function is to increase the economy of the engine 11. Various triggers can be used to initiate an E-stop based upon operation of various driver actions and further triggers based upon driver actions can be used to initiate an automatic restart following an E-stop. A suitable combination of stop and start triggers can be used. An automatic engine stop or E-stop is one where the engine 11 is temporarily stopped to save fuel and reduce emissions by the electronic controller 9 in response to one or more conditions based upon driver actions.

Figure 2:
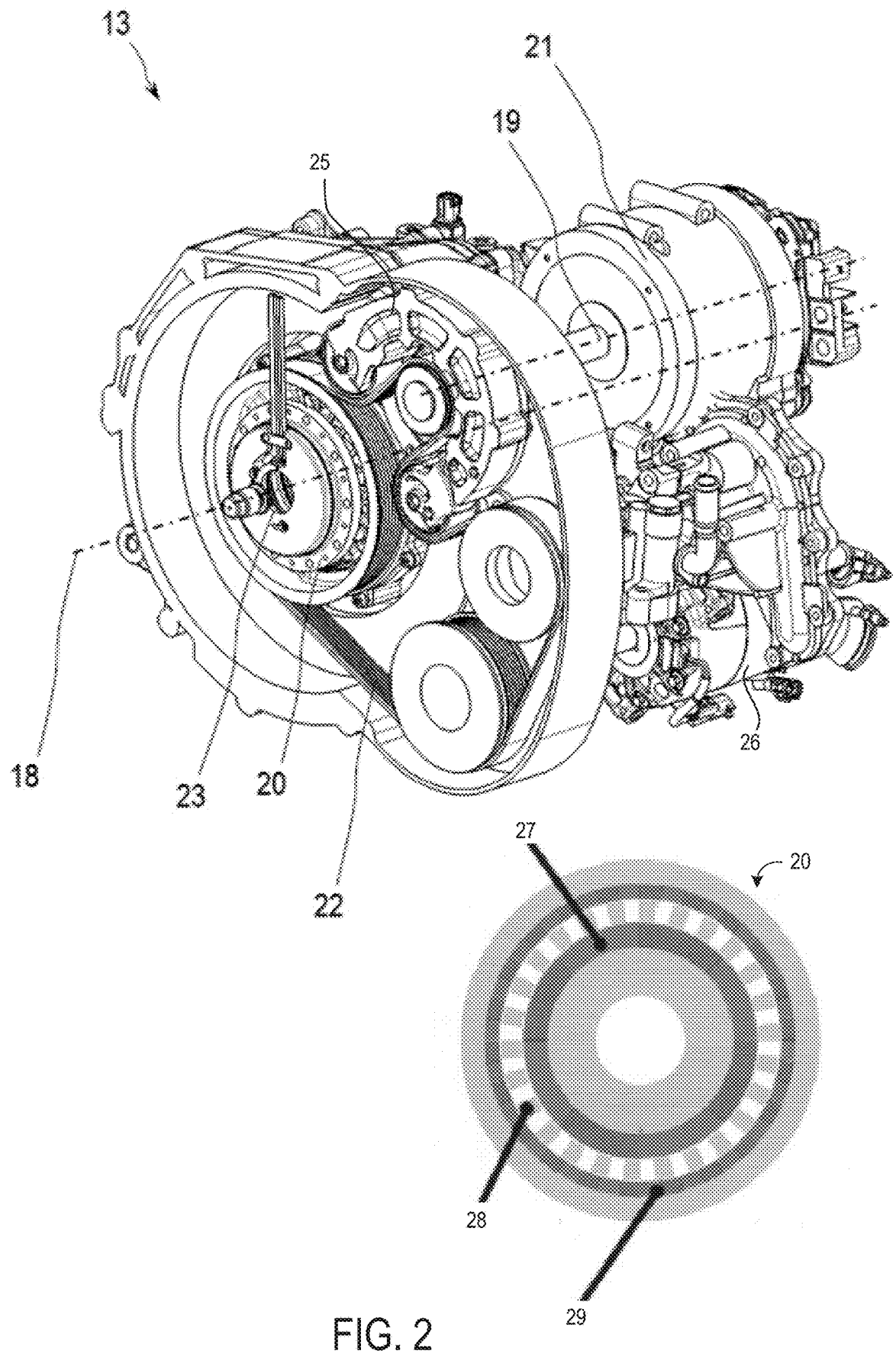
FIG. 2 shows a hybrid module according to the disclosure in an exemplary configuration.

Hybrid module 13 according to the disclosure is represented in an exemplary configuration in FIG. 2. Hybrid module 13 is configured to be mounted on internal combustion engine 11. Hybrid module 13 is configured to start internal combustion engine 11 in a state where it is mounted on internal combustion engine 11. To this end, hybrid module 13 is configured to generate a torque with electric motor 21 and transmit the torque to a crankshaft of the crank drive of internal combustion engine 11. Hybrid module 13 has an output element 23 which is positioned in an output axle 18. Output element 23 can be, for example, a belt pulley, a gear wheel, a ring, or a hub (as shown, output element 23 is configured as a belt pulley). Output axle 18 of hybrid module 13 is, in the state in which it is mounted on internal combustion engine 11, identical to a crankshaft axle of a crankshaft of internal combustion engine 11. For example, output axle 18 may be directly coupled to the crankshaft of the engine.

Electric motor 21 may be arranged in an electric motor axle 19 which is aligned in particular parallel to output axle 18. The transmission of the torque generated by electric motor 21 is carried out, for example, via a belt drive 22. In this way, the electric motor may drive (e.g., rotate) the electric motor axle 19, which may in turn rotate the belt of belt drive 22. The belt drive is configured to rotate the output element 23 and drive other components, such as AC compressor 26.

Hybrid module 13 comprises, according to the disclosure, a magnetic transmission 20. Magnetic transmission 20 may include two stages. Magnetic transmission 20 may be configured in such a manner that it may be operated in a first stage and in a second stage. Magnetic transmission 20 has, in the first stage, a different transmission ratio than in the second stage. In particular, magnetic transmission 20 is configured in the first stage in a reducing manner, in particular the reduction ratio is 1:3. In the second stage, the transmission ratio is in particular 1:1. Magnetic transmission 20 may be arranged in output axle 18. Output element 23 may be part of magnetic transmission 20.

FIG. 2 includes a zoomed-in view of magnetic transmission 20. As shown, magnetic transmission includes a high speed magnet rotor 27 (akin to a sun gear of a planetary gear system), a steel pole piece rotor (akin to a planet carrier) 28, and an outer magnet array 29 (akin to a ring gear). The illustrated magnetic transmission is a coaxial magnetic gear that includes three concentric rotors with different pole pairs. The inner rotor (rotor 27) is comprised of eight permanent magnets (PMs), thus forming four pole pairs. The outer rotor (rotor 29) includes 44 PMs, thus forming 22 pole pairs. In the inner and outer rotors, the permanent magnets may be arranged in a Halbach array configuration. Twenty-six pieces of steel are included in the middle stationary ring. Thus, as shown, the magnetic transmission 20 has a gear ratio of 22/4, or 5.5. However, the gear ratio may be any suitable number and may be adjusted by adjusting the number of pole pairs in the inner and/or outer rotors.

In an example, the magnetic transmission 20 may be configured to result in a transmission ratio of 1:3. For example, the inner rotor 27 may be coupled to the electric motor (e.g., via belt 22) and may rotate at a first speed. The steel pole piece rotor 28 may be coupled to the crankshaft (e.g., via output element 23 and output axle 18) and may be rotated by the rotation of the inner rotor 27, at a second speed. The outer rotor 29 may be stationary. The configuration of the magnetic transmission (e.g., number of pole pairs on each rotor) may be such that the first speed is three times as high as the second speed, e.g., for every three rotations of the inner rotor, the steel pole piece may rotate one time. In other examples, the steel pole piece rotor may be stationary and the outer rotor may be rotatable by the inner rotor and may be coupled to the crankshaft. In still further examples, all of the inner rotor, outer rotor, and steel pole piece rotor may be rotatable. The magnetic transmission may include a mechanism that may be activated to switch between transmission ratios, such as an electromechanically- or hydraulically-actuated strap brake or an electromechanically-actuated clutch disc.

Figure 3:
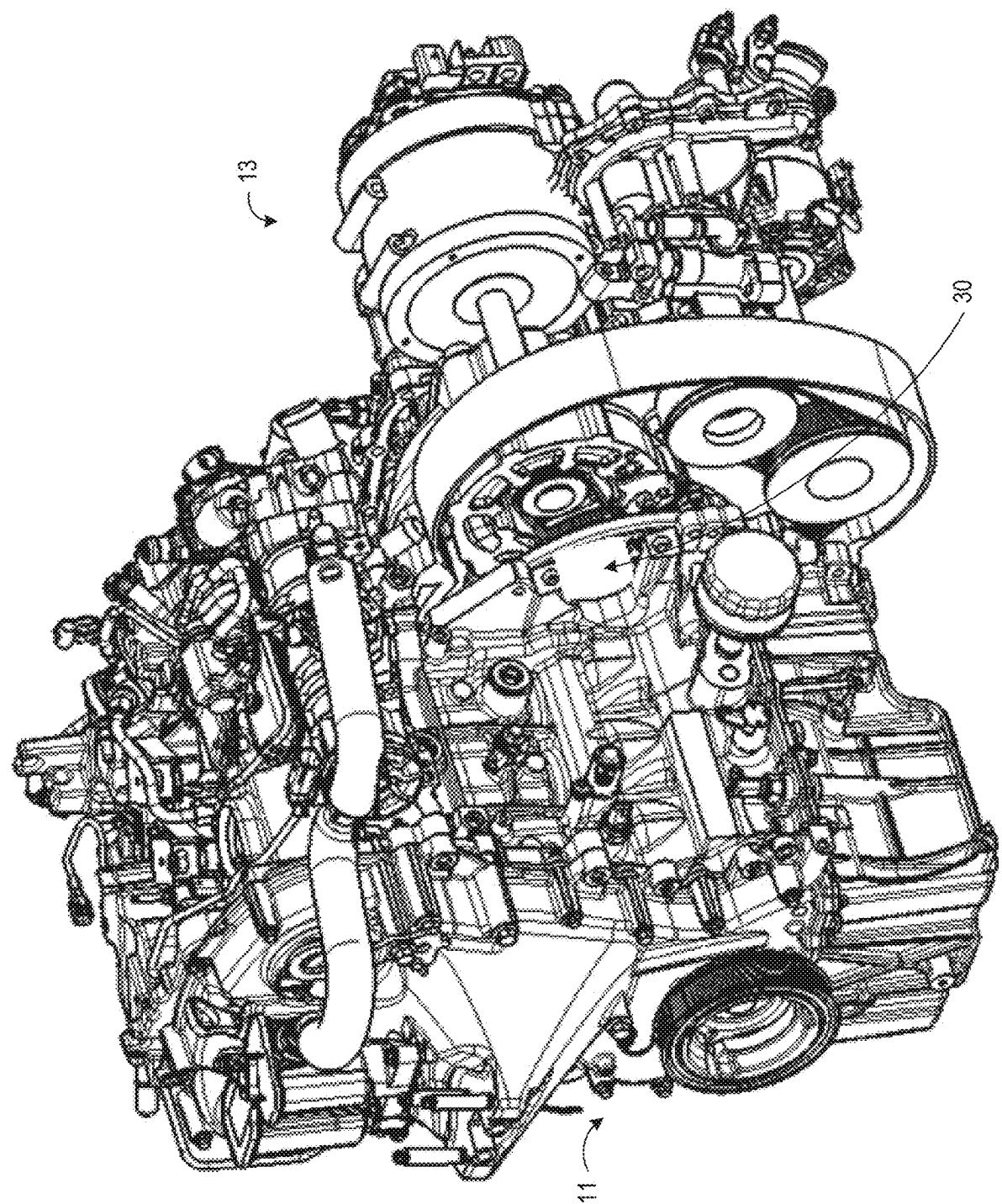
FIG. 3 shows the hybrid module of FIG. 2 coupled to an engine.

FIG. 3 shows the hybrid module 13 coupled to the engine 11. In the region generally shown by arrow 30, a starter device is typically included to start the engine during conditions where extra torque beyond what the electric motor 21 can provide is needed to crank the engine. In FIG. 3, the starter device is omitted and the electric motor, via the magnetic transmission when indicated, is solely used to start the engine.

Figure 4:
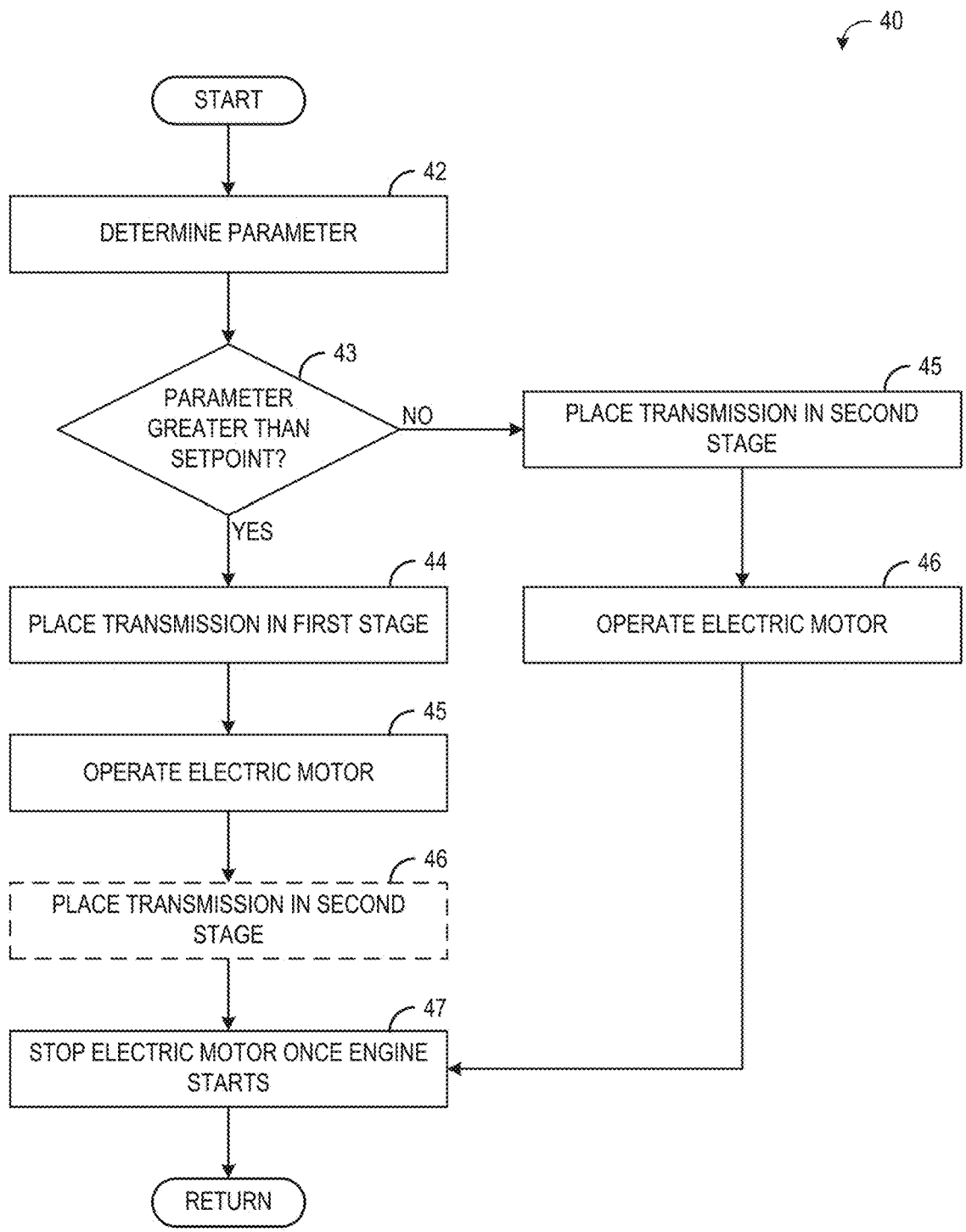
FIG. 4 is a flow chart illustrating a starting process according to the disclosure in an exemplary configuration.

Referring now to FIG. 4, a starting process according to the disclosure is represented in an exemplary configuration. In the case of starting process 40 according to the disclosure, internal combustion engine 11 may be started by the operation of hybrid module 13. Here, electric motor 21 is operated in an electric motor running mode 45 and a torque is generated with electric motor 21 which is transmitted to the crankshaft of internal combustion engine 11.

According to the disclosure, the transmission of the torque generated by electric motor 21 is configured as a function of a parameter. The parameter is determined in a determination 42 and may be compared in a subsequent test 43 with a predefined setpoint value. Depending on the result of test 43 of the parameter, the torque generated by electric motor 21 for starting internal combustion engine 11 may be increased or maintained.

The increase in the torque generated by electric motor 21 is achieved by a reduction in which the rotational speed is reduced and the torque is increased. To this end, magnetic transmission 20 is operated in a first magnetic transmission operation 44 in the first stage.

The maintenance of the torque generated by electric motor 21 is achieved by a transmission without increase or reduction. To this end, magnetic transmission 20 is operated in a second magnetic transmission operation 46 in the second stage.

The determined parameter may be directly measured, calculated, or assumed. The determined parameter may be a breakaway torque of the crank drive of internal combustion engine 11. The breakaway torque may be determined, for example, indirectly by the measurement of a temperature, an increased breakaway torque being assumed if a predefined threshold temperature is undershot. For example, the temperature of a cooling fluid of internal combustion engine 11 may be measured. An external temperature could also be measured.

The breakaway torque may also be determined from other values, such as a period of time. An increased breakaway torque may thus also be assumed if the last engine start was a certain period of time ago.

Moreover, an increased breakaway torque may be determined in that electric motor 21 is operated during second magnetic transmission operation 46 and the crankshaft is not caused to move. In other words, if the electric motor is operated with the magnetic transmission in the second stage (with a ratio of 1:1) and the crankshaft does not rotate, the breakaway torque may be assumed to above the setpoint value and the magnetic transmission may be adjusted to the first stage (e.g., with a ratio of 1:3).

In the case of an increased breakaway torque, first magnetic transmission operation 44 is carried out and the torque generated by electric motor 21 is increased. In the case of a non-increased breakaway torque, second magnetic transmission operation 46 is carried out and the torque is maintained. It is optionally possible to begin with first magnetic transmission operation 44 and then change to second magnetic transmission operation 46. It is thus achieved that an increased torque is available at the start and a higher rotational speed is available later. It is represented in this manner in FIG. 4.

After the starting of internal combustion engine 11, an electric motor stop 47 is carried out, with which starting process 40 is terminated.

Figure 5:
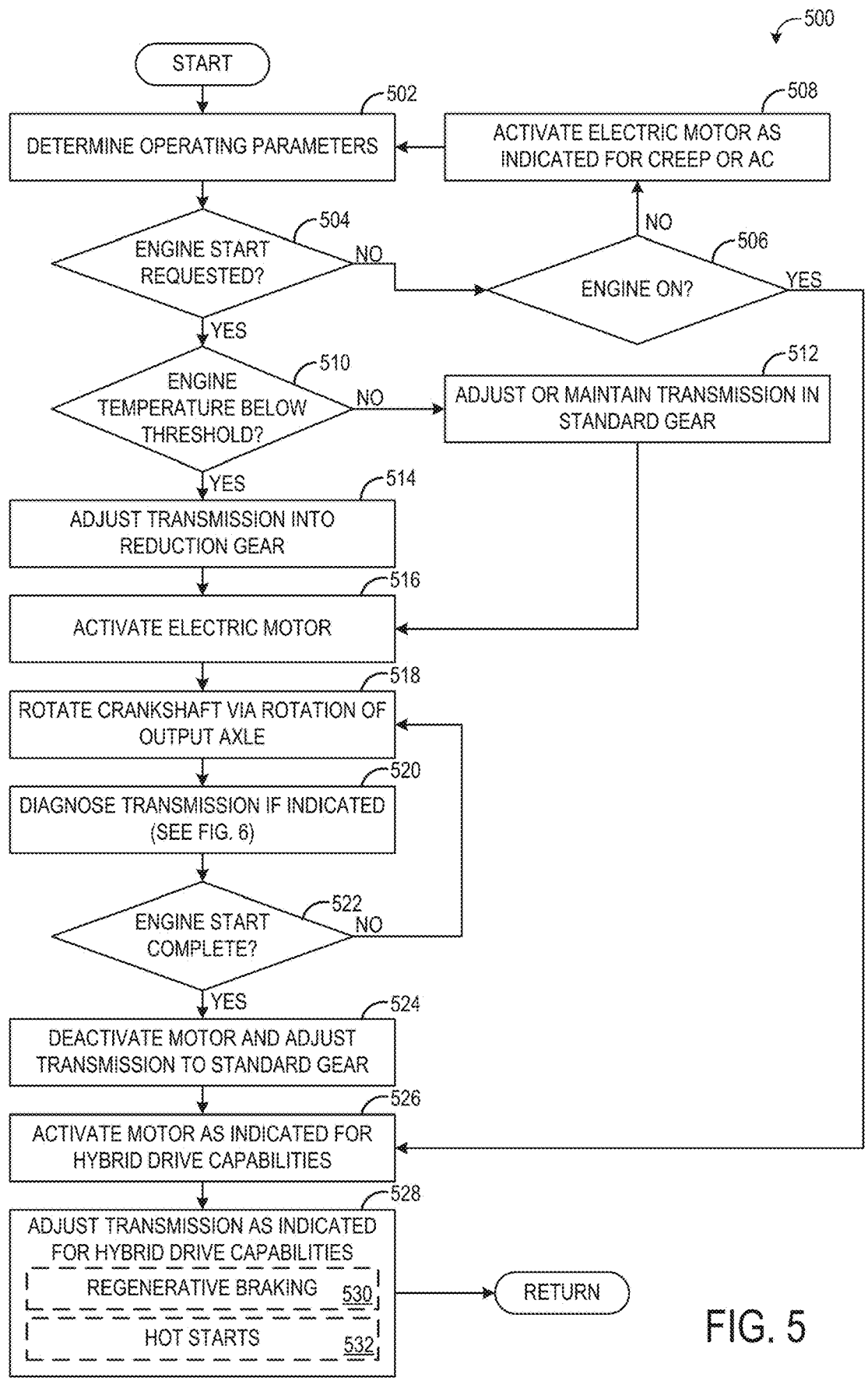
FIG. 5 is a flow chart illustrating an example method for operating an engine and a hybrid module.

FIG. 5 is a flow chart illustrating a method 500 for operating a hybrid drive, such as hybrid module 13, configured to start and to provide torque assist to an engine, such as engine 11. Method 500 (and all other methods described herein) may be performed according to instructions stored in memory of a controller, such as electronic controller 9, and in conjunction with signals received from sensors of the engine system, such as the sensors described above with reference to FIG. 1 (e.g., an engine temperature sensor). The controller may employ actuators of the vehicle system (e.g., magnetic transmission) to adjust vehicle operation, according to the methods described below.

At 502, method 500 includes determining operating parameters. The determined operating parameters may include vehicle status (operating or shutoff), engine status (on/combusting or off/not combusting), transmission gear, engine temperature, and other parameters. At 504, method 500 includes determining in an engine start request is received. The engine start request may include a key-on event initiated by an operator of the vehicle (e.g., turning of an ignition, pressing of a push-button start, remote start, and so forth). In another example, the engine start may include an automatic start initiated by the start-stop controller in response to an indication of an upcoming torque request (e.g., release of a brake pedal, depression of an accelerator pedal).

If an engine start request is not received, method 500 proceeds to 506 to determine if the engine is already on. If the engine is not already on, method 500 proceeds to 508 to activate the electric motor of the hybrid drive (e.g., motor 21) as indicated. For example, during an automatic stop, the electric motor may be activated to drive the wheels of the vehicle in order to allow vehicle creep. In another example, the electric motor may be activated to drive a compressor of an AC system, to facilitate vehicle cabin cooling during an automatic stop or to defrost the vehicle during a pre-heating condition prior to a vehicle start. The method then returns to 502 to continue monitoring operating parameters. If the engine is already on, method 500 proceeds to 526, which will be explained in more detail below.

Returning to 504, if it is determined that an engine start has been requested, method 500 proceeds to 510 to determine if engine temperature is below a threshold temperature. The threshold temperature may be a relatively cold temperature, such as near freezing (e.g., 5° C. or below). At low engine temperatures, a higher amount of torque may be required to rotate the engine, relative to higher engine temperatures (e.g., above 5° C.). This may be due to the formation of ice crystals in the engine, high viscosity of engine oil, etc. As explained previously, the electric motor may not output sufficient torque to crank the engine at low engine temperatures. However, by transmitting the torque through a transmission that is configured to lower cranking speed while increasing torque, the electric motor may be used to crank the engine during an engine start at low temperatures. At higher temperatures, the torque from the electric motor may be sufficient to crank the engine, and thus the torque may be transmitted to the crankshaft through the transmission at a 1:1 ratio.

Accordingly, if the engine temperature is not below the threshold, method 500 proceeds to 512 to adjust or maintain the transmission in a standard gear. The standard gear may comprise a gear/transmission ratio at which the electric motor typically drives the engine. In the example presented herein, the ratio may be 1:1, such that the same amount of torque that is applied to the transmission from the electric motor is applied to the crankshaft. As explained above with respect to FIG. 2, the transmission may be a magnetic transmission comprising an inner rotor, outer rotor, and intermediate steel pole piece rotor, where the inner and outer rotor are configured with a suitable number of magnet pole pairs, and where the intermediate steel pole piece rotor is configured with a suitable number of pole pieces, to create a gear ratio of 1:3, for example, or other suitable reduction gear. Thus, to operate in the standard, 1:1 gear, a locking mechanism may be engaged to directly couple the inner rotor to the outer rotor (or intermediate steel pole piece, depending on the configuration of the magnetic transmission), for example. In other examples, the intermediate steel pole piece rotor may be adjustable to change the degree or percentage of coupling between the inner rotor and the outer rotor. This may be accomplished by mounting two individual intermediate rotors on a common, keyed shaft, and providing a control mechanism for phase adjustment of the respective magnetic fields. An alternate method is to provide a single, integrated intermediate rotor having interleaved poles with an external phase control for the respective magnetic fields. In still further examples, the nominal gear ratio of the magnetic transmission may be 1:1 (e.g., due to the inner and outer rotors having the same number of pole pairs).

Upon adjusting (or maintaining) the transmission into the standard gear, method 500 proceeds to 516 to activate the electric motor, and at 518, to rotate the crankshaft via rotation of the output axle of the transmission. When in the standard gear, the crankshaft may be rotated at a first speed and at a first torque. The first speed may be relatively high (e.g., higher than the second speed described below), thus facilitating a rapid engine start.

Returning to 510, if it is determined that the engine is below the threshold temperature, method 500 proceeds to 514 to adjust the transmission into a second, reduction gear. The reduction gear may cause the output shaft of the transmission (and hence the crankshaft) to rotate more slowly than the input shaft (which is driven by the electric motor). The reduction gear may be a 1:3 ratio, or other suitable ratio such as 1:2 or 1:4. To adjust the transmission to the reduction gear, the electro-mechanical or hydraulic mechanism described above may be engaged or disengaged, depending on the configuration of the system. In one example, the electro-mechanical mechanism may be activated to place the transmission into the reduction gear. The magnetic transmission may remain in the standard gear when the electro-mechanical mechanism is deactivated. In this way, current may only be applied during cold engine starts, minimizing the energy for operating the magnetic transmission. In another example, to adjust the transmission to the reduction gear, the intermediate rotor may be adjusted to adjust the degree or percentage of coupling between the inner rotor and the outer rotor.

At 516, method 500 includes activating the electric motor and at 518, rotating the crankshaft via rotation of the output axle. When the transmission is in the reduction gear, the crankshaft may be rotated at a second speed and at a second torque, where the second speed is lower than the first speed and the second torque is higher than the first torque. When the electric motor is activated and the crankshaft is rotated, fuel is also injected into the engine and combustion is initiated in the cylinders of the engine.

At 520, method 500 includes diagnosing the transmission if indicated by the controller. The diagnostic routine to diagnose whether the transmission is functional or degraded is explained below with respect to FIG. 6. At 522, method 500 determines if the engine start is complete. The engine start may be complete once sufficient combustion is occurring in the cylinders to sustain rotation of the crankshaft. The engine start may be determined to be complete based on engine speed, operator release of the ignition key, exhaust oxygen content, and/or other suitable parameters. If the engine start is not complete, method 500 returns to 518 and continues to rotate the crankshaft with the electric motor.

If the engine start is complete, method 500 proceeds to 524 to deactivate the electric motor and adjust the transmission to the standard gear (if the transmission was previously in the reduction gear). By returning the transmission to the standard gear (which may have a higher gear ratio than the reduction gear), the crankshaft of the engine may be rotated at a higher speed during torque assist operations (relative to the reduction gear). At 526, method 500 includes activating the electric motor as indicated for hybrid drive capabilities, such as to provide torque assist, power vehicle power consumers (e.g., coolant pump, AC compressor), and act as a generator during regenerative braking events.

At 528, method 500 includes adjusting the transmission as indicated for hybrid drive capabilities. In some examples, the transmission may be operated in the standard gear at all times other than cold engine starts as described above. However, in other examples, it may be beneficial to operate in the reduction gear during some conditions. As one example indicated at 530, the transmission may be operated in the reduction gear during regenerative braking, in order to rotate the electric motor at a higher speed. During regenerative braking, the momentum of the crankshaft may be used to rotate the electric motor in a generator mode, thereby generating electricity for storage in a battery. If the transmission is adjusted to the reduction gear, the electric motor may be spun faster than if the transmission were in the standard gear. As another example indicated at 532, the reduction gear may be used during hot engine starts (e.g., where the engine is near 100° C.), as it may be desirable to start the engine at a lower speed during hot engine conditions. Method 500 then returns.

Figure 6:
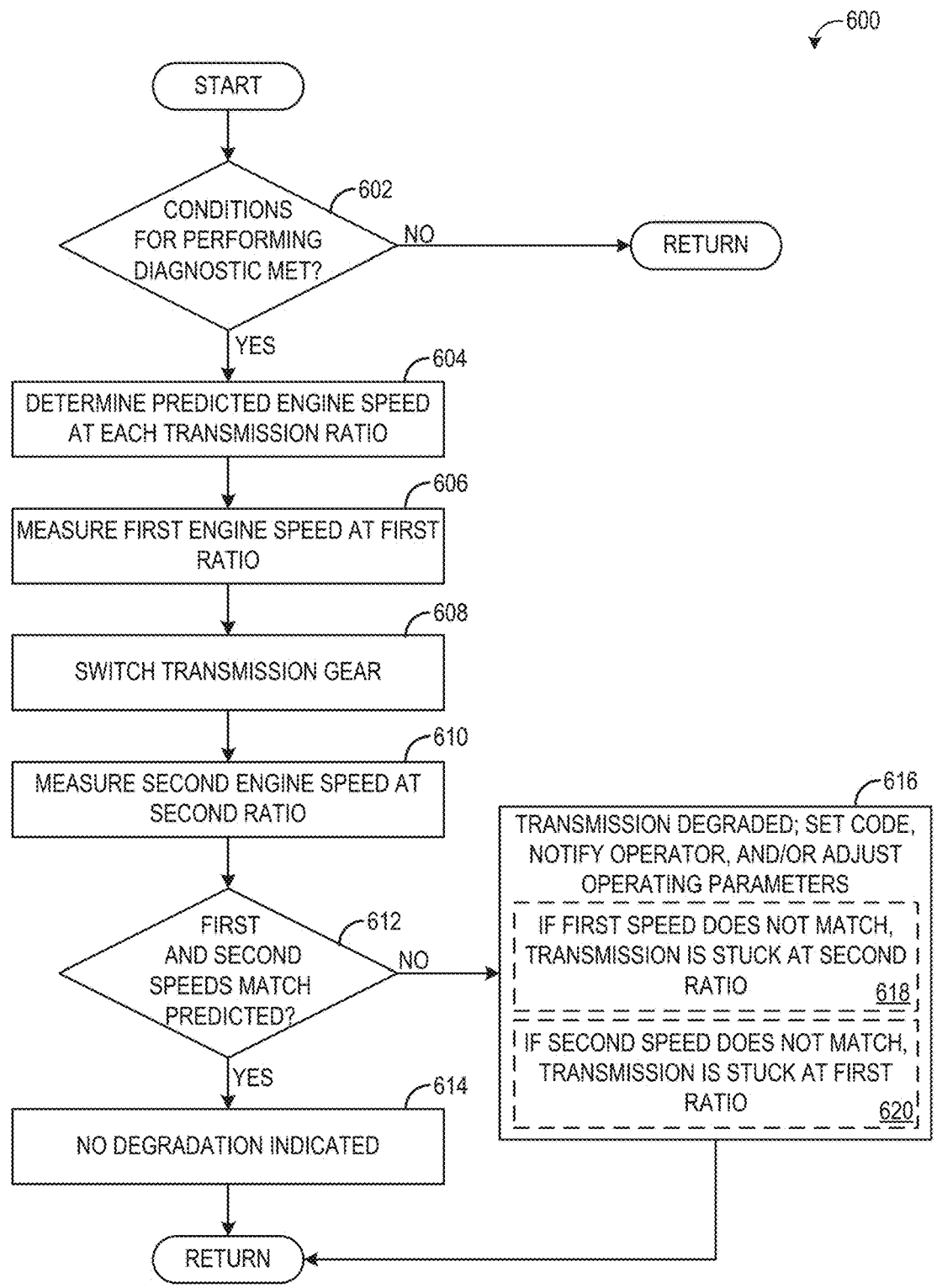
FIG. 6 is a flow chart illustrating an example method for performing a diagnostic routine on a transmission of a hybrid module.

FIG. 6 is a flow chart illustrating a method 600 for diagnosing a transmission coupling an electric motor to an engine, such as magnetic transmission 20 described above. In some examples, method 600 may be performed as part of method 500, for example during engine cranking of a cold engine start. In other examples, method 600 may be performed during other conditions, as described herein. At 602, method 600 includes determining if conditions for performing the diagnostic routine are met. The conditions may include a duration having elapsed since a previous diagnostic routine was carried out (e.g., one week, one hundred miles driven, or other suitable duration). The conditions may also include the electric motor being used to drive the crankshaft of the engine during non-combustion conditions, such as during cranking at an engine start or when the motor is propelling the vehicle at low vehicle speeds. The conditions may further include the engine and electric motor being operable to switch between transmission gears. For example, at a cold engine start, once the initial inertia of the engine has been overcome with the transmission in the reduction gear, the remainder of the engine start may be carried out with the transmission in the standard gear. If the conditions have not been met, method 600 returns and waits until the conditions are met.

If the conditions have been met, method 600 proceeds to 604 to determine a predicted engine speed at each transmission ratio. For example, the electric motor may be configured to spin the engine at a first speed (such as 400 RPM) when the transmission is at the standard gear and spin the engine at a second, lower speed (such as 300 RPM) with the transmission in the reduction gear. However, operating conditions may impact the actual speed the electric motor can rotate the engine, such as ambient temperature, battery state of charge, or other conditions. Thus, the first and second speeds may be corrected to account for the operating conditions to determine the predicted speeds.

At 606, method 600 includes measuring a first engine speed at a first transmission ratio. The engine speed may be measured at the transmission gear that transmission is currently operating in, such as the reduction gear (in the example where the diagnostic is performed during a cold engine start). At 608, method 600 includes switching the transmission gear, for example from the reduction gear to the standard gear. At 610, method 600 includes measuring a second engine speed at the second transmission ratio. At 612, method 600 includes determining if the first and second engine speeds match the respective predicted speeds. In order to be considered matching speeds, the measured speeds may be within a threshold range of the respective predicted speed, such as within 50 RPM. If both the first and second measured engine speeds match their respective predicted speed, method 600 proceeds to 614 to indicate that no degradation is detected in the transmission. Method 600 then returns.

If the first and/or second measured engine speed does not match its respective predicted speed, method 600 proceeds to 616 to indicate that the transmission is degraded. Upon determining the transmission is degraded, a diagnostic code may be set, an operator may be notified of the degradation, and/or operating parameters may be adjusted. Additionally, as indicated at 618, if the first measured speed does not match the speed predicted for that gear ratio (for example, if the engine speed measured at the reduction gear does not match the predicted engine speed for the reduction gear), it may be determined that the transmission is stuck at the second ratio (e.g., in the standard gear). Likewise, as indicated at 620, if the second measured speed does not match the speed predicted for that gear ratio (for example, if the engine speed measured at the standard gear does not match the predicted engine speed for the standard gear), it may be determined that the transmission is stuck at the first ratio (e.g., in the reduction gear). In some examples, such as during a cold engine start event, if the transmission is stuck in the standard gear, an engine start may not be possible, as the electric motor may not generate sufficient torque to start the engine without the extra torque supplied by the reduction gear. Thus, if no engine rotation is detected during the diagnostic, it may be determined the transmission is stuck in the standard gear; however, other types of degradation may also cause the engine to fail to rotate at the engine start, and thus a secondary check may be carried out (such as performing the diagnostic routine at another engine start during a warmer engine temperature where the electric motor can start the engine in the standard gear). In further examples, rather than determining predicted engine speeds, the diagnostic may monitor engine speed during the adjustment from the first gear ratio to the second gear ratio. If engine speed does not change (e.g., increase upon changing from the reduction gear to the standard gear), the magnetic transmission may be determined to be degraded.

If the transmission is determined to be degraded and the diagnostic identifies that the transmission is stuck in the standard gear, vehicle operations may not be greatly affected, other than the inability to start the engine at very cold temperatures. Thus, if the transmission is determined to be stuck in the standard gear, automatic stops may be suspended and/or the vehicle may be maintained in an engine-on mode, at least when engine or ambient temperature is below a threshold, to reduce the number of engine starts. If the diagnostic identifies that the transmission is stuck in the reduction gear, some vehicle operations may be affected. For example, the electric motor may not be able to provide target torque assist to the engine. Thus, if the transmission is stuck in the reduction gear, the method may include adjusting vehicle operating parameters, such as intake throttle position, spark timing, and/or fuel injection parameters such as injection timing, injection quantity, etc. For example, if the transmission is unable to rotate the crankshaft at the higher speed associated with operation in the standard gear, some engine operating parameters may be adjusted to account for the lower assist capabilities of the electric motor, such as advancing or retarding spark timing. As another example, without the full capabilities of the electric motor, the vehicle may exhibit turbo lag, and thus some parameters (such as wastegate position) may be adjusted to attempt to lessen the turbo lag.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hybrid module for arrangement on an internal combustion engine, and configured for starting the internal combustion engine, the hybrid module comprising:
   an electric motor outputting torque via an electric motor axle;
   an output element of a magnetic transmission positioned on an output axle of the hybrid module and connected to a crankshaft of the internal combustion engine; and
   the magnetic transmission transmitting torque from the electric motor axle to the output element.

2. The hybrid module as claimed in claim 1, wherein the magnetic transmission is arranged centrally with respect to the output axle.

3. The hybrid module as claimed in claim 1, wherein the magnetic transmission has a first stage with a first transmission ratio and a second stage with a second transmission ratio which is different from the first transmission ratio.

4. The hybrid module as claimed in claim 3, wherein the first transmission ratio of the first stage is a reduction ratio.

5. The hybrid module as claimed in claim 4, wherein the reduction ratio is 1:3.

6. The hybrid module as claimed in claim 4, wherein the second stage has a transmission ratio of 1:1.

7. A method, comprising:
   starting an internal combustion engine with torque generated by an electric motor and transmitted to a crankshaft of the internal combustion engine; and
   modifying the torque via a magnetic transmission as a function of a determined engine parameter and the determined engine parameter comprises a breakaway torque of a crank drive.

8. The method as claimed in claim 7, wherein modifying the torque comprises increasing the torque in a first magnetic transmission operation responsive to the breakaway torque being equal to or greater than a specific value.

9. The method as claimed in claim 8, wherein increasing the torque in the first magnetic transmission operation comprises adjusting the magnetic transmission to a first gear having a first transmission ratio.

10. The method as claimed in claim 9, further comprising maintaining the torque in a second magnetic transmission operation responsive to the breakaway torque being below the specific value.

11. The method of claimed in claim 10, wherein maintaining the torque in the second magnetic transmission operation comprises maintaining the magnetic transmission in a second gear having a second transmission ratio.

12. The method as claimed in claim 11, wherein the first transmission ratio is 1:3 and the second transmission ratio is 1:1.

13. The method as claimed in claim 8, further comprising estimating the breakaway torque based on a temperature of the engine.

14. A method, comprising:
    transmitting torque from an electric motor to an engine via a magnetic transmission; and
    during an engine start, adjusting a gear ratio of the magnetic transmission based on engine temperature including adjusting the gear ratio to a first, lower gear ratio responsive to the engine temperature being below a threshold temperature at the engine start.

15. The method of claim 14, further comprising maintaining the gear ratio in a second, higher gear ratio responsive to the engine temperature being above the threshold temperature at the engine start.

16. The method of claim 15, further comprising, during the engine start when the magnetic transmission is in the first gear ratio, switching the gear ratio from the first gear ratio to the second gear ratio, and indicating the magnetic transmission is degraded responsive to an engine speed changing by less than a threshold amount.

17. The method of claim 15, further comprising, once the engine is operating following the engine start, adjusting or maintaining the magnetic transmission in the second gear ratio.

18. The method of claim 17, further comprising adjusting the magnetic transmission to the first gear ratio responsive to a regenerative braking event where torque from a crankshaft is transmitted to the electric motor.

* * * * *